US008943911B1

(12) United States Patent
Terrell et al.

(10) Patent No.: US 8,943,911 B1
(45) Date of Patent: Feb. 3, 2015

(54) REMOTE MONITORING OF STRATIFIED LAYERS IN GREASE INTERCEPTORS

(76) Inventors: Mark C. Terrell, Northborough, MA (US); Lawrence W. Hill, Eastham, MA (US)

(*) Notice: Subject to any disclaimer, the term of this patent is extended or adjusted under 35 U.S.C. 154(b) by 99 days.

(21) Appl. No.: 13/347,689

(22) Filed: Jan. 10, 2012

Related U.S. Application Data

(60) Provisional application No. 61/431,339, filed on Jan. 10, 2011.

(51) Int. Cl.
*E03F 5/16* (2006.01)
*G01F 23/00* (2006.01)

(52) U.S. Cl.
CPC .................................. *G01F 23/0007* (2013.01)
USPC ....................................................... 73/865.8

(58) Field of Classification Search
None
See application file for complete search history.

(56) References Cited

U.S. PATENT DOCUMENTS

| | | |
|---|---|---|
| 3,025,962 A | 3/1962 | Williams |
| 3,792,347 A | 2/1974 | Hawley |
| 3,923,655 A | 12/1975 | McKinney |
| 4,121,094 A | 10/1978 | DiVito et al. |
| 4,680,475 A | 7/1987 | Tansony et al. |
| 4,973,970 A | 11/1990 | Reeser |
| 4,974,446 A | 12/1990 | Vigneaux |
| 5,076,100 A | 12/1991 | Hunter et al. |
| 5,121,340 A | 6/1992 | Campbell et al. |
| 5,431,826 A | 7/1995 | Becker et al. |
| 5,563,845 A | 10/1996 | Walsh |
| 5,604,582 A | 2/1997 | Rhoads et al. |
| 5,698,775 A | 12/1997 | Philip et al. |
| 5,736,637 A | 4/1998 | Evans et al. |
| 5,935,449 A * | 8/1999 | Buehler et al. ................. 210/742 |
| 5,946,967 A | 9/1999 | Russell |
| 6,012,020 A | 1/2000 | Gardell et al. |
| 6,014,076 A | 1/2000 | Luzzader |
| 6,217,752 B1 | 4/2001 | Coots |
| 6,619,118 B1 | 9/2003 | Keck |
| 6,879,935 B2 | 4/2005 | Keck |
| 6,979,403 B2 | 12/2005 | Rodis |
| 7,336,190 B2 | 2/2008 | Giordano, Jr. et al. |
| 7,628,918 B2 | 12/2009 | Bovaird |
| 2002/0111846 A1 | 8/2002 | Singer |
| 2005/0029201 A1 * | 2/2005 | Rodis ............................ 210/744 |
| 2005/0236307 A1 * | 10/2005 | Mazurek et al. ................ 210/86 |
| 2008/0060430 A1 | 3/2008 | Galloway et al. |
| 2008/0120162 A1 * | 5/2008 | Carmody .......................... 705/8 |

(Continued)

FOREIGN PATENT DOCUMENTS

CA 2525855 4/2005

*Primary Examiner* — Robert R Raevis
(74) *Attorney, Agent, or Firm* — O'Connell Law Firm; Thomas P. O'Connell

(57) ABSTRACT

A system for remotely monitoring stratified layers in grease interceptors with a sensing unit for being disposed in a grease interceptor, a wireless transmitter electrically coupled to the sensing unit for transmitting acquired data regarding the stratified layers in the grease interceptor wirelessly from the grease interceptor, and a central server for receiving acquired data transmitted by the wireless transmitter. Data regarding stratified layers can be transmitted wirelessly automatically after predetermined time periods for analysis and display, such as on an internet website. Electronic message notifications, such as emails and text messages, regarding acquired data can be sent automatically in response to a predetermined relationship between acquired data and predetermined target levels of stratified layers.

18 Claims, 5 Drawing Sheets

(56) References Cited

U.S. PATENT DOCUMENTS

| | | | |
|---|---|---|---|
| 2008/0227180 A1* | 9/2008 | Bovaird | 435/262.5 |
| 2009/0082880 A1* | 3/2009 | Saunders | 700/9 |
| 2009/0109057 A1 | 4/2009 | Lenger | |
| 2009/0139325 A1* | 6/2009 | Cunningham et al. | 73/304 C |

\* cited by examiner

12/29/2009
Director of Facilities

Site: #3371-Southington
Alerts: There is a current alert for: pumpout due within a week, currently at 25% sludge/grease capacity.

Site: #3390 Manchester
Alerts: There is a current alert for: pumpout due within two weeks, 20% ... all grease.

Site: #4934 Taunton
Alerts: There is a current alert for: pumpout due within two weeks, 21%.

Data: Available online – click on this link: Boston  Note – With multiple sites, the Chainwide Summary Page directs you to each site by clicking on the site link in the first cell.  Navigate to detail charts and data for each prior month and year by pressing the appropriate tab at the bottom of the Site Summary Page. To return to the Chainwide Summary Page from each site, click on the site title link in the summary tab.

Your user name is "Clemens" and your password is "rocket". Note they are case sensitive.

Thank you for using SepSensor Grease Interceptor Remote Monitoring

FIG. 3

CUSTOMER SUMMARY PAGE

LAST UPDATED: 12/29/2009

| SITE | LOCATION | UPDATED | PROJ. NEXT PUMPOUT | LAST PUMPOUT | CURRENT % SLUDGE | CURRENT % GREASE | TOTAL % GREASE AND SLUDGE | TANK SIZE (GAL) | LIMIT TOTAL % GREASE AND SLUDGE | PUMP |
|---|---|---|---|---|---|---|---|---|---|---|
| #123 | BOSTON | 12/28/10 | 02/28/10 RE: GREASE LIMIT | 10/15/09 | 0% | 6% | 6% | 3,000 | 6" GREASE AND 8" SLUDGE | BIGCO |

FIG. 4

REMOTE MONITORING OF STRATIFIED LAYERS IN GREASE INTERCEPTORS

FIELD OF THE INVENTION

The present invention relates generally to measuring and testing methods and instruments. Stated more particularly, disclosed herein are a system and method for remotely monitoring stratified layers in commercial grease interceptors.

BACKGROUND OF THE INVENTION

One knowledgeable in the field will be aware that managing grease interceptors in food service establishment applications represents a major challenge. This is particularly true where management of multiple grease traps or interceptors must be carried out over a wide geography. Most food service establishments have limited field resources dedicated and available to monitoring grease trap performance.

Consequently, on-site inspection of interceptors is often ignored or overlooked. Where inspection is carried out, it may be left to the judgment of untrained personnel or to pumping companies charged with periodically pumping waste from the grease trap. Untrained personnel may misinterpret or ignore grease trap conditions, and pumping companies may be considered to have an interest in pumping even when unnecessary. Furthermore, where a pumping company removes waste grease, there may be no independent method for confirming that the pumping was carried out properly or even whether it was actually carried out at all.

However, proper monitoring and maintenance of a grease interceptor provides a plurality of important advantages. For example, monitoring can provide insight into certain inefficient interceptor operations or malfunctions, such as high water, potential downstream lateral line restrictions, plumbing problems, residual grease build ups, and even poor kitchen practices. Real-time and ongoing performance data enable facility managers to optimize the maintenance budgets for grease-related expenses while avoiding expensive post-backup remediation and overflows.

Under the practices of the prior art, many food service establishments have attempted to predict when pumping might be required based on past performance or to initiate pumping only in response to a known pumping requirement. However, there are numerous variables that frustrate the ability to predict grease trap conditions safely and efficiently. For example, required pumping will vary based on the menu, the number of meals served, seasonal business variations, the level of grinding, and the performance of the pump operator.

Methods and devices have been disclosed by the prior art for manually sampling the contents of grease traps and other containment vessels to attempt to gain a reading of settled solids, liquids, and other layers. One method involves opening the containment vessel and inserting a clear tubular member, such as that indicated at 100 in FIG. 2, into the contained materials. As the tube 100 is inserted into the vessel, a valve at the bottom of the tube 100 is opened to permit materials to flow into the tube 100 until the bottom of the tank is reached. Then, a valve must be actuated to close the tube 100 to trap the material inside. The tube 100 is then removed and the level of the retained materials must be manually measured, such as by a tape measure 200 or markings disposed on the tube 100. Then, the contents must be released by manually actuating the valve.

Obviously, such methods suffer from a number of drawbacks. Manually checking material levels is inherently messy and time consuming and requires full access to the interior of the containment vessel. With such drawbacks, ignoring the need for sampling becomes much more likely. Moreover, manual sampling is prone to error and demands some level of expertise and diligence. Likewise, visual inspections of grease interceptors can be deceiving and do not reveal any information beyond the top layer of material.

Accordingly, monitoring is often carried out improperly or not at all. Even where monitoring is undertaken, it is far from convenient and may be done only sporadically. Accordingly, necessary pumping may be foregone thereby resulting in overflows and consequential damage and disruption to normal business operations. In other cases, pumping may be carried out prematurely based on an incorrect belief of an imminent need for material removal thereby wasting time and resources.

With a knowledge of the previous state of the art, the present inventors appreciated a need for a system and method for remotely monitoring stratified layers in grease interceptors on a continual basis in an accurate manner and for providing remote access to acquired information without a need for manually accessing the grease interceptors.

SUMMARY OF THE INVENTION

Accordingly, the present invention was founded on the basic object of providing a system and method for remotely monitoring stratified layers in grease traps on a continual or continuous basis in an accurate manner without a need for manually accessing the containment vessel to conduct the monitoring.

A more particular object of embodiments of the invention is to provide a system and method for remotely monitoring materials in grease interceptors that can supply periodic status updates wirelessly to be received and, potentially, disseminated in relation to a central location.

A related object of embodiments of the invention is to enable facility managers to schedule pumping or other remedial intervention at suitable and efficient intervals thereby to avoid unnecessary, premature intervention while also avoiding overflow or other malfunction of a monitored grease interceptor thereby enabling intervention when and only when required.

A further object of embodiments of the invention is to provide a system and method for remotely monitoring stratified layers in grease interceptors that can validate pumping and other remedial intervention procedures automatically and remotely.

These and further objects and advantages will become obvious not only to one who reviews the present specification and drawings but also to one who has an opportunity to make use of an embodiment of the present invention for a system and method for remotely monitoring stratified layers in grease interceptors. Although the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

In carrying forth the objects of the invention, one embodiment of the system for remotely monitoring stratified layers in grease interceptors is founded on a sensing unit for being disposed in a grease interceptor. The sensing unit has sensing means for sensing stratified layers in the grease interceptor and means for acquiring data from the sensing means regarding the stratified layers in the grease interceptor. A wireless transmitter is electrically coupled to the sensing unit for transmitting acquired data regarding the stratified layers in the grease interceptor wirelessly from the grease interceptor, and central server receives acquired data transmitted by the wireless transmitter.

In certain embodiments, the sensing unit can have an elongate sensing rod with a plurality of sensors spaced along the elongate sensing rod. The sensing unit can additionally have a main housing, and housing electronics can be disposed in the main housing. A secondary sensing rod can have a sensing portion disposed generally parallel to the sensing rod, and a plurality of sensors can be spaced along the sensing portion of the secondary sensing rod. With that, the plurality of sensors spaced along the sensing rod can act as grease and sludge sensors, and the plurality of sensors spaced along the secondary sensing rod can function as flood sensors. Where the elongate sensing rod is considered to have a proximal end and a distal end, a first group of sensors can be disposed adjacent to the proximal end of the elongate sensing rod and a second group of sensors can be disposed adjacent to the distal end of the elongate sensing rod. While the type of sensors can vary widely within the scope of the invention except as it might be expressly limited, the sensors in on contemplated embodiment comprise sensor electrodes. Furthermore, a temperature sensor retained by the sensing unit can detect temperature conditions in the grease interceptor for being remotely transmitted from the grease interceptor.

Under particular constructions of the invention, the wireless transmitter comprises a cellular data modem and a wireless antenna, and acquired data regarding the stratified layers in the grease interceptor is transmitted using a wireless network. The data regarding the stratified layers in the grease interceptor can be acquired over predetermined time periods, and that acquired data can then be transmitted wirelessly to the central server, such as automatically after each predetermined time period.

Means can additionally be provided for producing charts of acquired data regarding the stratified layers in the grease interceptor over time. Furthermore, means can be provided for automatically comparing acquired data regarding the stratified layers in the grease interceptor to predetermined target levels for stratified layers in the grease interceptor. Still further, an internet website can be provided with means for displaying acquired data regarding the stratified layers in the grease interceptor. Under such an embodiment, the internet website can provide means for displaying data regarding stratified layers acquired by sensing units disposed in multiple grease interceptors disposed in different locations.

Furthermore, it is contemplated that means can be provided for sending electronic message notifications, such as emails, text messages, or other electronic notifications or combinations thereof, regarding acquired data regarding the stratified layers in the grease interceptor. The electronic message notifications can be sent automatically, such as in response to a comparison provided by means for automatically comparing acquired data regarding the stratified layers in the grease interceptor to predetermined target levels for stratified layers in the grease interceptor. For example, the electronic message notifications can be sent automatically in response to a predetermined relationship between the acquired data and the predetermined target levels. The electronic message notifications can further include means for displaying data regarding stratified layers acquired by sensing units disposed in multiple grease interceptors disposed in different locations.

One will appreciate that the foregoing discussion broadly outlines the more important goals and features of the invention to enable a better understanding of the detailed description that follows and to instill a better appreciation of the inventors' contribution to the art. Before any particular embodiment or aspect thereof is explained in detail, it must be made clear that the following details of construction and illustrations of inventive concepts are mere examples of the many possible manifestations of the invention.

BRIEF DESCRIPTION OF THE DRAWINGS

In the accompanying drawing figures:

FIG. 3 is a printout of an email notification provided under the remote monitoring system disclosed herein;

FIG. 4 is a multi-location Customer Summary Page provided under the invention.

DETAILED DESCRIPTION

As is the case with many inventions, the present invention for a system and method for remotely monitoring stratified layers in grease interceptors disclosed herein is subject to a wide variety of embodiments. However, to ensure that one skilled in the art will be able to understand and, in appropriate cases, practice the present invention, certain preferred embodiments of the broader invention revealed herein are described below and shown in the accompanying drawing figures.

Figure 1:
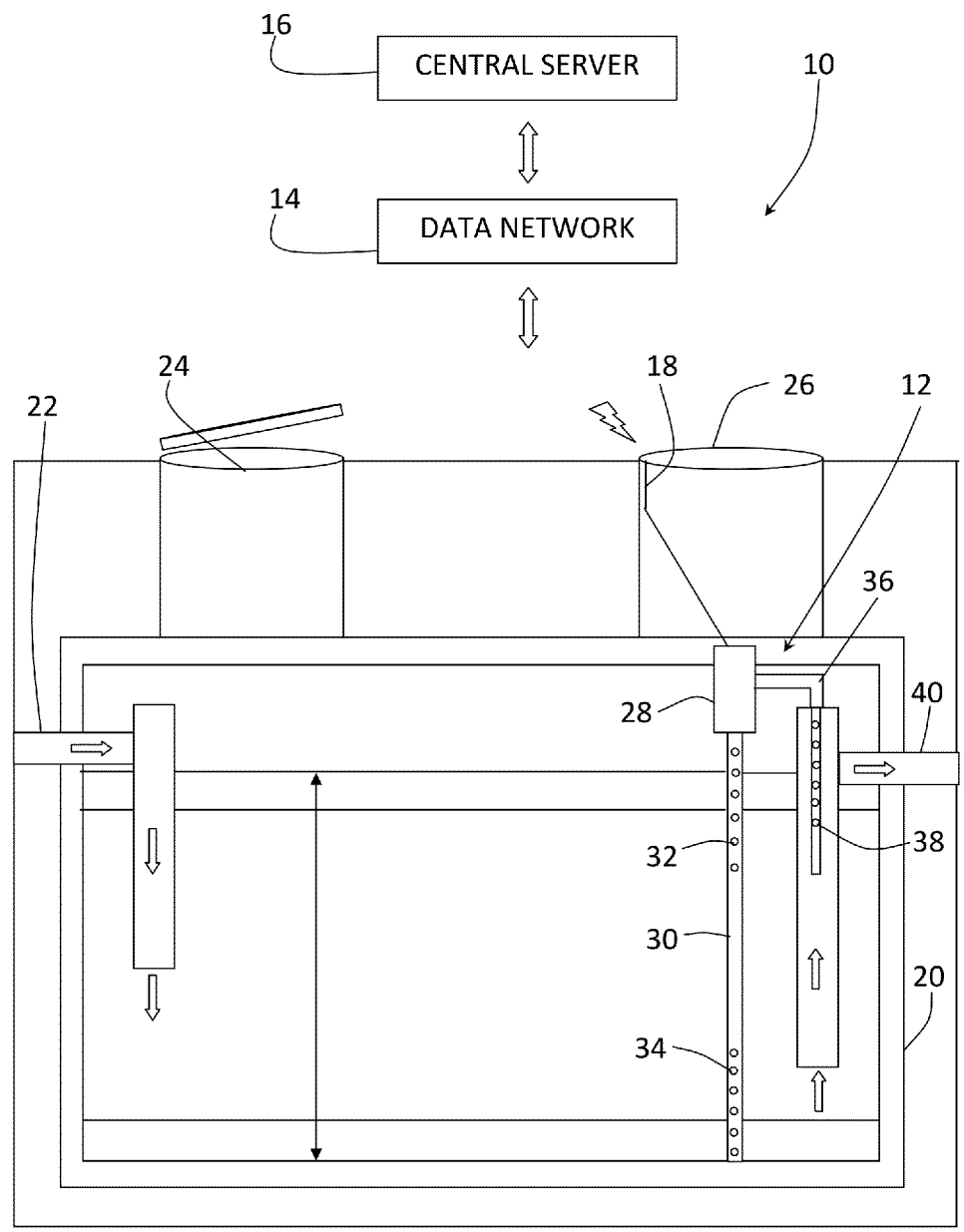
FIG. 1 is a schematic view of a remote monitoring system as taught herein disposed in relation to a typical grease interceptor.
Figure 2:
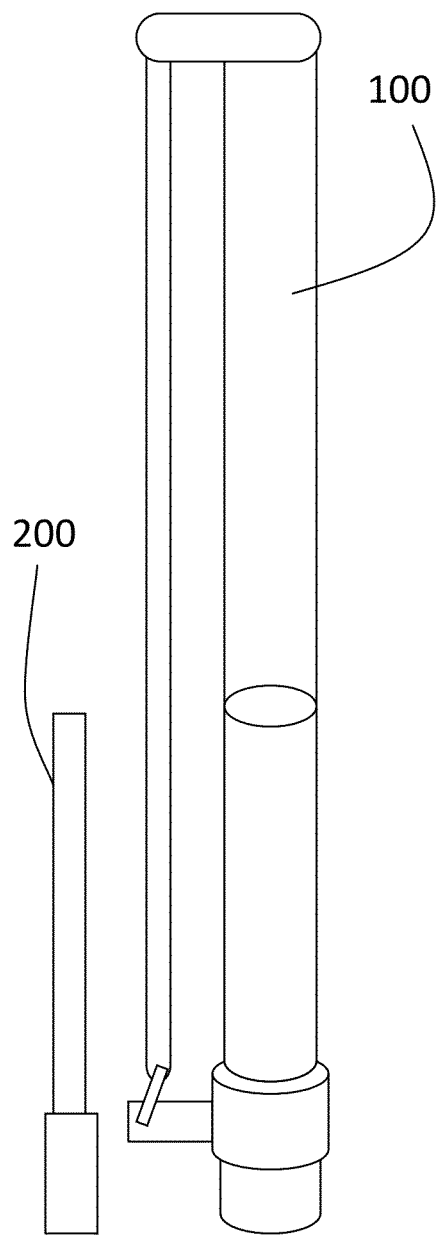
FIG. 2 provides photographic perspective views of a manual sampling device for analyzing materials in grease interceptors according to the prior art.

A schematic depiction of an embodiment of the system for remotely monitoring stratified layers in grease interceptors is indicated generally at 10 in FIG. 1. The system 10 can be considered to be founded on a sensing unit 12. The sensing unit 12 is disposed in a grease interceptor or trap 20 at a food service establishment as would be employed to intercept most greases and solids before they enter a wastewater disposal system. As indicated, the grease interceptor 20 retains a plurality of stratified material layers, namely a bottom layer of sludge, an upper layer of grease, and a middle zone of liquid. The grease interceptor 20 has first and second riser manholes 24 and 26, which are normally capped. An inlet port 22 with a generally horizontal intake tube fixed to a vertical riser tube receives waste from the food service establishment, and an outlet port 40 with a vertical riser tube fixed to a generally horizontal discharge tube discharges effluent to a wastewater disposal system.

During proper operation of the grease interceptor 20, the upper ends of the riser tubes are disposed above the top of the grease layer, and the bottom of the riser tubes are disposed within the liquid zone. Material will thus enter the tank through the inlet port 22 to enter the liquid zone for decomposition and separation, and material will be exhausted from the grease interceptor 20 by being received into the bottom of the riser tube of the outlet port 40.

The sensing unit 12 has a main housing 28 for housing electronics, any necessary power source, and potentially other system components. An elongate sensing rod 30 has a first end fixed to the main housing 28 and a second end for being disposed in contact with the bottom of the grease interceptor 20. The sensing rod 30 has a height greater than the normal height of the several layers of material such that the sensing rod 30 will pass through all layers of material and the sensing unit 12 will normally be retained above the layers of material. A secondary sensing rod 36 has a proximal support portion that projects generally perpendicularly from the sensing unit 12 and a distal sensing portion that is disposed generally parallel to the sensing rod 30.

A plurality of sensors 32 and 34 are disposed along the sensing rod 30, and a plurality of sensors 38 are disposed along the distal sensing portion of the secondary sensing rod 36. More particularly, a first group of sensors 32 is disposed in series along the upper portion of the sensing rod 30 for sensing the location and thickness of the grease layer and the overall depth of the multiple layers of stratified material. A second group of sensors 34 is disposed in series along the lower portion of the sensing rod 30 for sensing the location and thickness of the sludge layer. From that combined information, the location and thickness of the liquid zone can additionally be determined. Of course, it would be possible and within the scope of the invention for there to be a continuous group of sensors 32, 34 along the entire length of the sensing rod 30.

Except as they may be expressly limited herein, the sensors 32, 34, and 38 can be of any effective type, including but not limited to the sensors shown and described in U.S. Pat. Nos. 6,619,118 and 6,879,935. For example, the sensors 32, 34, and 38 could comprise pressure sensors, thermal sensors, ultrasonic sensors, or substantially any other type of sensor that might now exist or hereafter be discovered. In one embodiment, the sensors 32, 34, and 38 comprise relatively small, hemispherical, chemically inert sensor electrodes. One or more sensors 32, 34, and 38 in each group may be designated as a reference sensor 32, 34, and 38. When disposed as shown in FIG. 1 in a grease interceptor 20, the series of sensors 32 disposed along the upper portion of the sensing rod 36 can be designated as grease sensors, the series of sensors 34 disposed along the lower portion of the sensing rod 36 can be designated as sludge sensors, and the series of sensors 38 disposed along the secondary sensing rod 36 and within the riser tube of the outlet port 40 can be designated as flood sensors.

Based on the data provided by the series of sensors 32, 34, and 38, the sensing unit 12 can be employed to determine, among other things, the depth of the grease layer and its percent capacity relative to liquid height, the depth of the sludge layer and its percent capacity relative to liquid height, and the combined depth of all layers and its percent capacity relative to liquid height. Provided with that information, an operator of a system 10 as taught herein can comply with what is referred to as the 25% rule under which the grease trap or interceptor 20 should be cleaned when 25% of its volume is occupied by accumulated by food, fat, oil, and grease. Moreover, proper completion of a pumping operation can be confirmed. Timely pump outs can be arranged, and pumper performance can be proactively managed. Operators can avoid paying for partial pump outs, and the ongoing efficiency of the grease interceptor 20 can be increased.

Additionally, one or more sensors 32, 34, or 38 could be employed to detect temperatures within the grease interceptor 20. Based on the knowledge that average temperatures outside a suitable range in a grease interceptor 20 can hinder proper material separation and decomposition, an operator can act to intervene as necessary and as may be possible to bring the grease interceptor 20 into a preferred temperature range.

Data acquired by the sensing unit 12 can be harvested and transmitted wirelessly to one or more recipients for analysis and processing. In this exemplary embodiment, a cellular data modem, such as a GSM modem, GPRS modem, or other type of cellular modem, and a wireless antenna 18 are electrically coupled to the main housing 28 of the sensing unit 12 for emitting a wireless signal from the sensing unit 12 and the grease interceptor 20 in general. In the depicted example, the antennae traverses from the main housing 28 to an area adjacent to or even protruding through the cap of the second riser manhole 26. The antennae 18 could, for example, be buried in a cut made in pavement surrounding the cap of the riser manhole 26, a surrounding portion of earth, or some other area.

Using the data modem and antennae 18, the sensing unit 12 can transmit data to a central computer server 16 using a cellular carrier data network 14, such as GSM, GPRS, or CDMA network and a carrier, or a TCP_IP network, potentially additionally or alternatively using an SMS data format. The central server 16 could be disposed at substantially any location where the data might be received and processed, including, for example, the main building of a given food service establishment, a designated location for a given group of establishments, a server of a governmental authority, a server of a remote monitoring service provider, or any combination, alternative, or variation thereof. Any site or sites remote to the grease interceptor 20 could receive the data. Data can be transmitted only as an upload from the sensing unit 12 to the central server 16 or bi-directionally to permit commands to be sent to the sensing unit 12 from the central server 16. Software updates and any necessary software fixes can be remotely downloaded to the sensing unit 12 from the central server 16 or any other authorized remote source.

Figure 5:
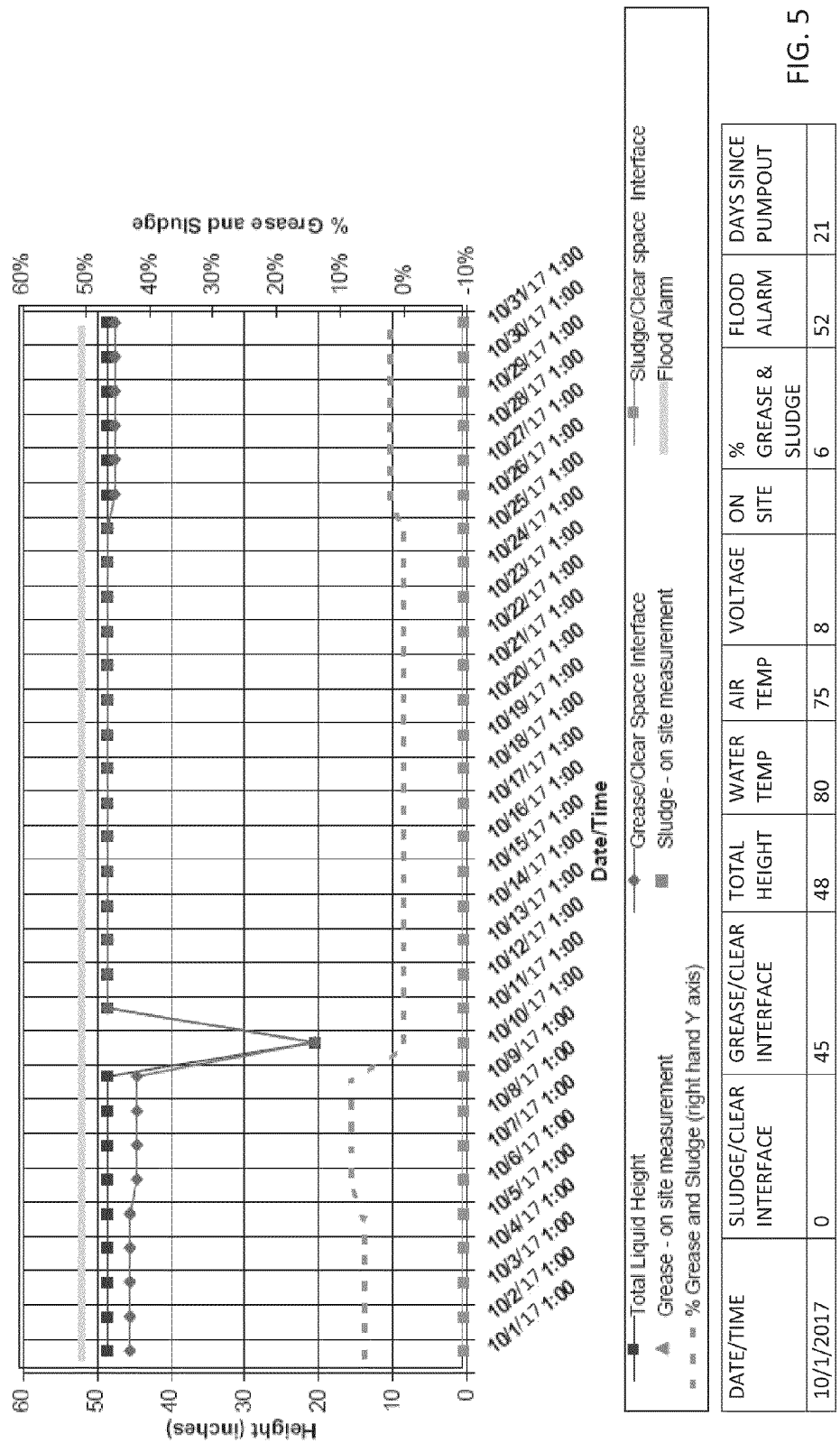
FIG. 5 is a graph of monthly performance provided under the invention.

Data readings from the sensors 32, 34, and 38 indicating the conditions within the grease interceptor 20 can be transmitted from the sensing unit 12 remotely to the central server 16 periodically, continuously over a given time period, on request, or some combination or modification thereof. In one possible example, readings could be taken by the sensing unit 12 and stored in memory every fifteen minutes to observe activity within the grease interceptor 20. Then, one or more times per day, a brief call can be made from the sensing unit 12 to the central server 16 to upload the data from the time period since the last data upload. Using that analyzed data, the system 12 can produce a chart of percent levels of the several layers of stratified material over time as shown in FIG. 5. That chart can be reviewed remotely by the monitoring service and by system operators, authorized pumping companies, governmental entities, and other authorized persons. As FIG. 5 shows, the date-stamped chart provides daily levels and a clear indication of a successful pumpout.

Raw data can be analyzed at any given stage or stages, such as at the central server 16, to establish the above-described layer and overall heights and other characteristics. As taught herein, the resulting analyzed data can be made available by any effective method or methods to monitoring service and monitoring personnel and, additionally or alternatively, operators of the local sites. In one practice of the invention, data can be published to the monitoring service website and accessed by appropriate personnel, such as through a user name and password combination. Once the data is received and analyzed, it can be recorded and measured, such as by the monitoring service, against the design capacity of the individual grease interceptor 20 and predetermined target levels of the several stratified layers and the total thereof for pumping.

If pumping is required based on a comparison of the actual values to the predetermined values, a notification, such as an email, can be generated and sent to appropriate personnel, such as a facility manager, an owner, monitoring personnel, or some combination or variation thereof. An example of a potential email sent to a food service industry operator responsible for multiple grease trap installations is shown in FIG. 3. There, the time stamped correspondence indicates current alerts for three sites, each with a specified projected pumpout time requirement and a percentage analysis of contained layers of material. Any other designated party, such as the contracted pumper or municipal regulator, could additionally or alternatively be automatically notified. Furthermore, continual updates or updates at specified levels within the grease interceptor 20 could be sent to any of the referenced parties.

Still further, authorized persons can log in at their discretion to a predesignated internet or other accessible electronic site, such as an internet website operated by a monitoring service, to access current, actionable information. Consequently, a food service industry operator, such as an operator of a restaurant chain, can thus view the status of all grease interceptor containment vessels 20 in a chain by computer, cellular telephone, or from any other single location without manually accessing or testing even a single grease interceptor 20. A Customer Summary Page for a food service establishment having multiple chain locations is shown in FIG. 4. There, the operator can perceive an identification of the site, such as the site number and location, the date of last update of sensed information, the projected next pumpout date, the date of the last pumpout, the current percentage levels of each of the grease and sludge layers, the overall tank size, the total percent of grease and sludge, and the responsible pumping company. Operators can thus efficiently schedule pumping, prevent disruptions in business by avoiding system backups, and ensure that regulatory standards for effluent discharge are met.

Based on the foregoing, the system 10 and method disclosed herein can be seen to provide wireless communication of detailed and continually updated, readily accessible information to remote access sites in one database regarding multiple grease interceptors 20. The system 10 is easy to install and maintain and can be continuously operable. System operators can obtain actionable data either automatically or on their own initiative to enable predictive maintenance and the avoidance of interruptions and damage that might derive from system failures. Pumping of grease interceptors 20 can be carried out when and only when required. Maintenance history can be tracked and confirmed for regulatory purposes and for confirming proper pumping procedures.

With certain details of the present invention for a system and method for remotely monitoring stratified layers in grease interceptors disclosed, it will be appreciated by one skilled in the art that changes and additions could be made thereto without deviating from the spirit or scope of the invention. This is particularly true when one bears in mind that the presently preferred embodiments merely exemplify the broader invention revealed herein. Accordingly, it will be clear that those with certain major features of the invention in mind could craft embodiments that incorporate those major features while not incorporating all of the features included in the preferred embodiments.

Therefore, the following claims are intended to define the scope of protection to be afforded to the inventors. Those claims shall be deemed to include equivalent constructions insofar as they do not depart from the spirit and scope of the invention. It must be further noted that a plurality of the following claims may express certain elements as means for performing a specific function, at times without the recital of structure or material. As the law demands, these claims shall be construed to cover not only the corresponding structure and material expressly described in this specification but also all equivalents thereof that might be now known or hereafter discovered.

We claim as deserving the protection of Letters Patent:

1. A system for remotely monitoring stratified layers in grease interceptors comprising:
    a sensing unit for being disposed in a grease interceptor wherein the sensing unit has an elongate sensing rod and a plurality of sensors spaced along the elongate sensing rod for sensing stratified layers in the grease interceptor and housing electronics for acquiring data from the plurality of sensors regarding the stratified layers in the grease interceptor;
    a wireless transmitter electrically coupled to the sensing unit for transmitting acquired data regarding the stratified layers in the grease interceptor wirelessly from the grease interceptor; and
    a central server for receiving acquired data transmitted by the wireless transmitter.

2. The system of claim 1 wherein the sensing unit has a main housing and wherein the housing electronics are disposed in the main housing.

3. The system of claim 1 further comprising a secondary sensing rod with a sensing portion disposed generally parallel to the sensing rod and further comprising a plurality of sensors spaced along the sensing portion of the secondary sensing rod.

4. The system of claim 3 wherein the plurality of sensors spaced along the sensing rod comprise grease and sludge sensors and wherein the plurality of sensors spaced along the secondary sensing rod comprise flood sensors.

5. The system of claim 2 wherein the elongate sensing rod has a proximal end and a distal end and wherein a first group of sensors is disposed adjacent to the proximal end of the elongate sensing rod and a second group of sensors disposed adjacent to the distal end of the elongate sensing rod.

6. The system of claim 1 wherein the plurality of sensors comprise sensor electrodes.

7. The system of claim 1 further comprising a temperature sensor retained by the sensing unit for detecting temperature conditions in the grease interceptor.

8. The system of claim 1 wherein the wireless transmitter comprises a cellular data modem and a wireless antenna wherein acquired data regarding the stratified layers in the grease interceptor is transmitted using a wireless network.

9. The system of claim 1 wherein data regarding the stratified layers in the grease interceptor is acquired over predetermined time periods and then transmitted wirelessly to the central server.

10. The system of claim 9 wherein the data regarding the stratified layers in the grease interceptor is transmitted wirelessly automatically after each predetermined time period.

11. The system of claim 9 further comprising means for producing charts of acquired data electronically regarding the stratified layers in the grease interceptor over time.

12. The system of claim 9 further comprising means for automatically comparing acquired data regarding the stratified layers in the grease interceptor to predetermined target levels for stratified layers in the grease interceptor electronically.

13. The system of claim 1 further comprising an internet website with means for displaying acquired data regarding the stratified layers in the grease interceptor.

14. The system of claim 13 wherein the internet website provides means for displaying data regarding stratified layers acquired by sensing units disposed in multiple grease interceptors disposed in different locations.

15. The system of claim 1 further comprising means for sending electronic message notifications regarding acquired data regarding the stratified layers in the grease interceptor.

16. The system of claim 15 wherein the electronic message notifications are sent automatically.

17. The system of claim 16 further comprising means for automatically comparing acquired data regarding the stratified layers in the grease interceptor to predetermined target levels for stratified layers in the grease interceptor electronically and wherein the electronic message notifications are sent automatically in response to a predetermined relationship between the acquired data and the predetermined target levels.

18. The system of claim 15 wherein the electronic message notifications include means for displaying data regarding stratified layers acquired by sensing units disposed in multiple grease interceptors disposed in different locations.

* * * * *